United States Patent
Kitazawa et al.

(10) Patent No.: US 9,266,271 B2
(45) Date of Patent: Feb. 23, 2016

(54) MOLDING DEVICE AND METHOD OF MANUFACTURING MOLDED PRODUCT

(75) Inventors: Toshiaki Kitazawa, Nagano (JP); Hisaomi Masuzawa, Nagano (JP); Shinsuke Araki, Aichi (JP); Takayuki Miyajima, Aichi (JP)

(73) Assignee: TAIHO KOGYO CO., LTD., Aichi (JP)

( * ) Notice: Subject to any disclaimer, the term of this patent is extended or adjusted under 35 U.S.C. 154(b) by 0 days.

(21) Appl. No.: 14/123,206

(22) PCT Filed: May 29, 2012

(86) PCT No.: PCT/JP2012/063724
§ 371 (c)(1),
(2), (4) Date: Nov. 30, 2013

(87) PCT Pub. No.: WO2012/165414
PCT Pub. Date: Dec. 6, 2012

(65) Prior Publication Data
US 2014/0097555 A1    Apr. 10, 2014

(30) Foreign Application Priority Data

May 31, 2011 (JP) ................................. 2011-122360

(51) Int. Cl.
*B22C 9/06* (2006.01)
*B29C 45/40* (2006.01)
*B22C 9/10* (2006.01)
*B22D 17/22* (2006.01)
(Continued)

(52) U.S. Cl.
CPC ............... *B29C 45/4005* (2013.01); *B22C 9/06* (2013.01); *B22C 9/065* (2013.01); *B22C 9/106* (2013.01); *B22D 17/2218* (2013.01); *B22D 17/2236* (2013.01); *B22D 17/24* (2013.01); *B22D 19/08* (2013.01); *B22D 29/00* (2013.01); *B29C 45/2614* (2013.01); *B29L 2023/004* (2013.01)

(58) Field of Classification Search
USPC .......................................................... 264/318
See application file for complete search history.

(56) References Cited

U.S. PATENT DOCUMENTS

2011/0014316 A1    1/2011    Huang

FOREIGN PATENT DOCUMENTS

| JP | 1978-008575 | 3/1978 |
| JP | 1979-012057 | 5/1979 |
| JP | 3-108521    | 5/1991 |
| JP | 1996-276259 | 10/1996 |

OTHER PUBLICATIONS

Extended European Search Report dated Oct. 13, 2014, corresponding to European U.S. patent No. 12792159.1.
(Continued)

*Primary Examiner* — Jacob T Minskey
(74) *Attorney, Agent, or Firm* — Hauptman Ham, LLP

(57) ABSTRACT

A molding device for manufacturing a molded product having an inner space bent in a circular arc shape includes: a set of molds joinable to and separable from each other, the set of molds being capable of forming a cavity having a shape corresponding to an outer shape of the molded product in a joined state at the time of molding; a core having an outer shape corresponding to an inner shape of the molded product for use in a state where the core is arranged in the inside of the cavity formed by the set of molds at the time of molding; and an ejector plate having a core through hole through which the core passes for ejecting the molded product formed around the core along the circular arc shape in a separated state where the set of molds is separated from each other.

9 Claims, 15 Drawing Sheets

(51) Int. Cl.
*B22D 17/24* (2006.01)
*B22D 19/08* (2006.01)
*B22D 29/00* (2006.01)
*B29C 45/26* (2006.01)
*B29L 23/00* (2006.01)

(56) References Cited

OTHER PUBLICATIONS

International Search Report for PCT/JP2012/063724 mailed Jul. 31, 2012.

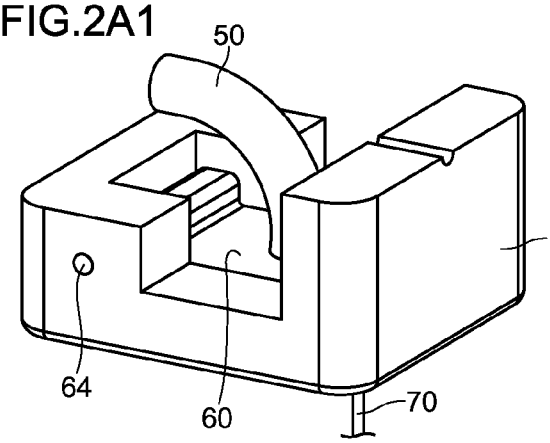
FIG.2A1
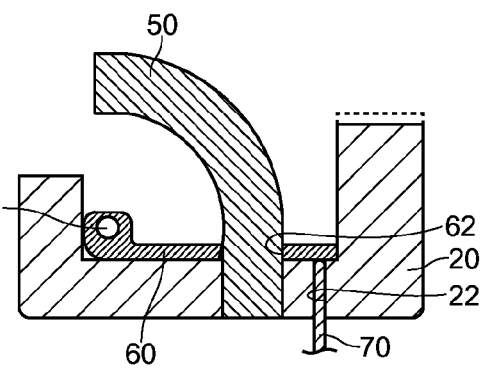
FIG.2A2
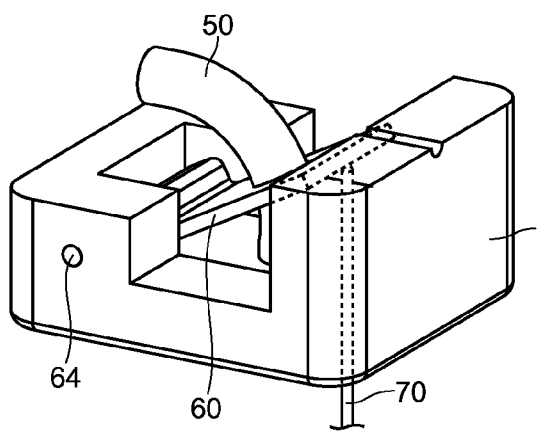
FIG.2B1
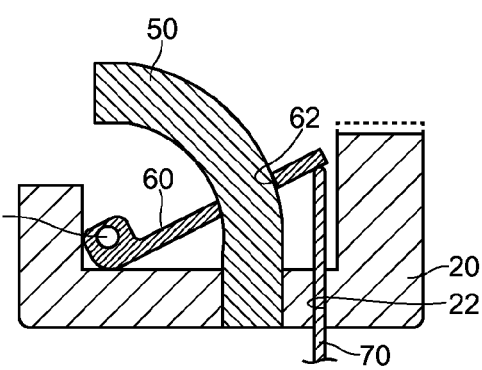
FIG.2B2
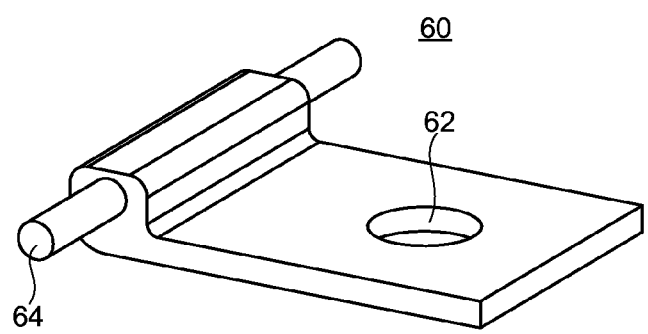
FIG.3

FIG.5A1 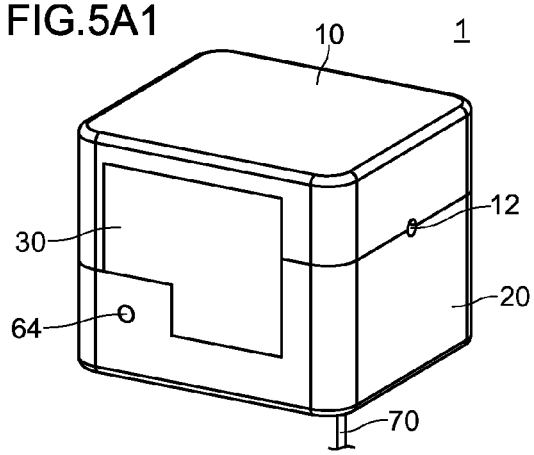
FIG.5A2 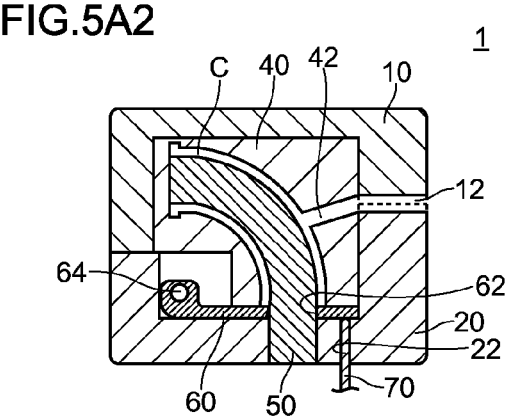
FIG.5B1 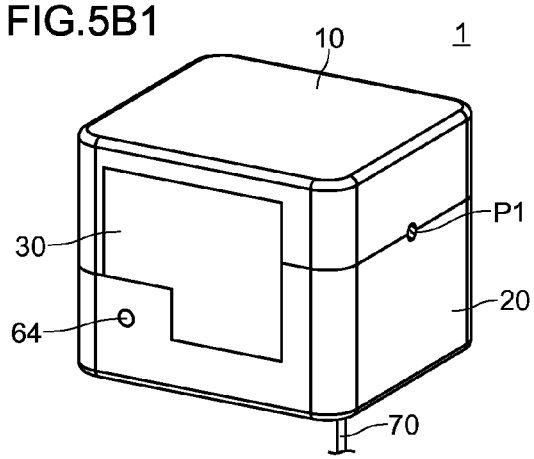
FIG.5B2 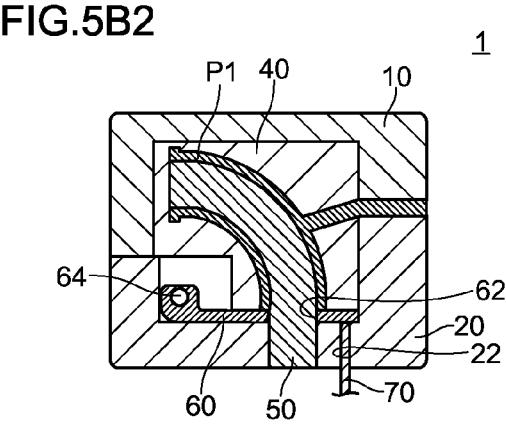
FIG.5C1 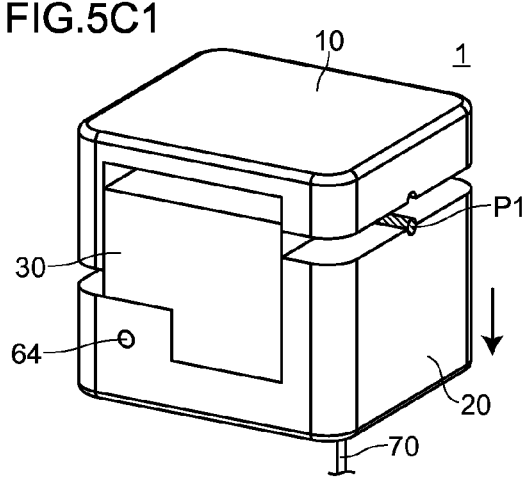
FIG.5C2 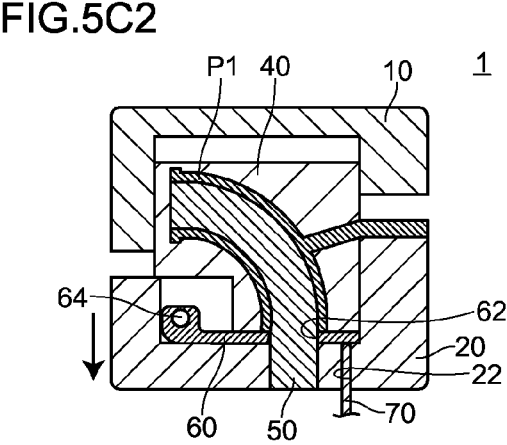

FIG.6A1
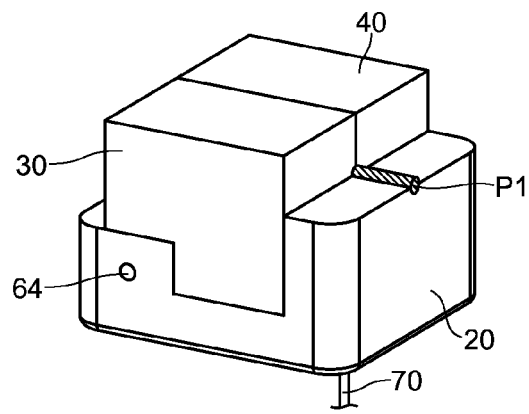
FIG.6A2
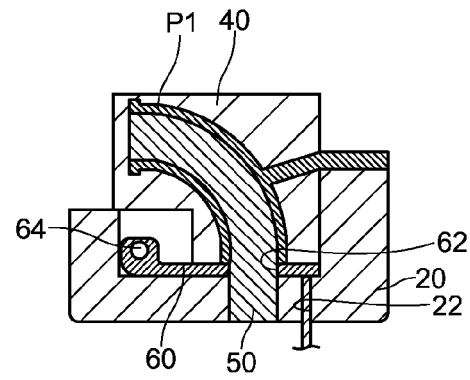
FIG.6B1
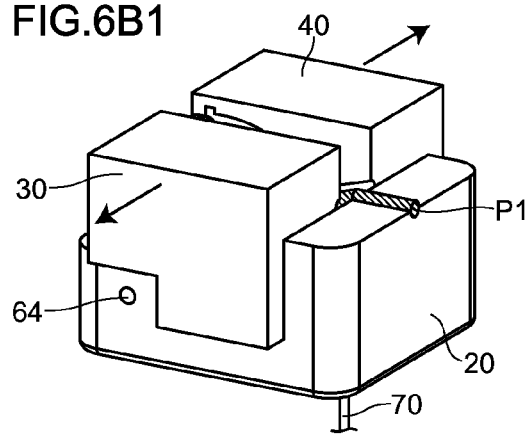
FIG.6B2
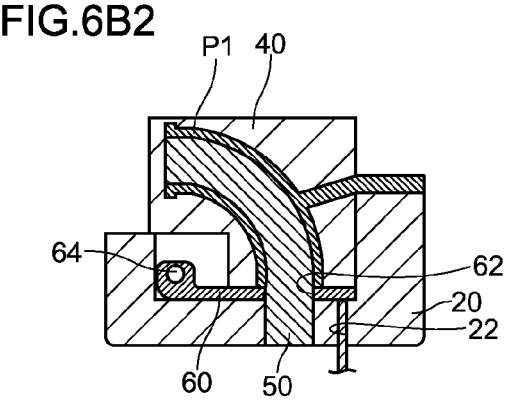
FIG.6C1
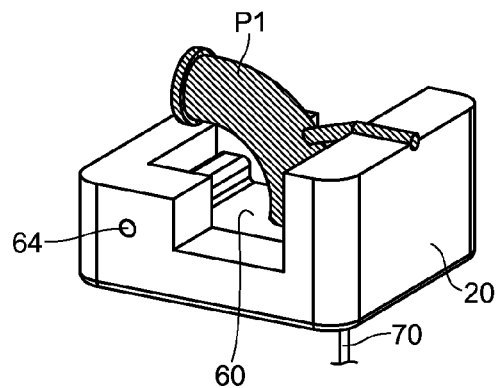
FIG.6C2
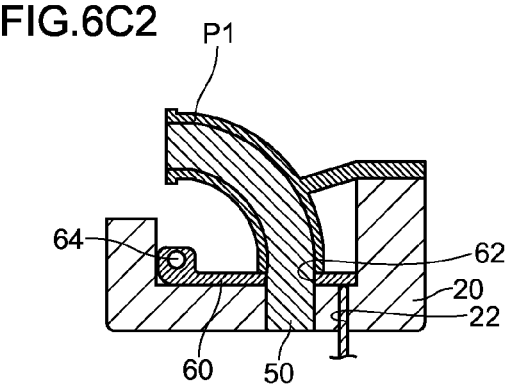

FIG.7A1
FIG.7A2
FIG.7B1
FIG.7B2
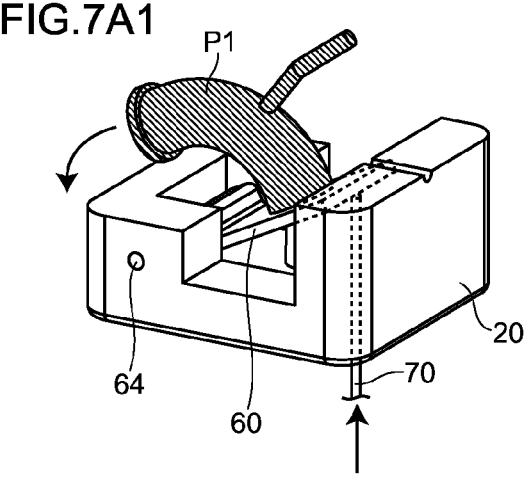
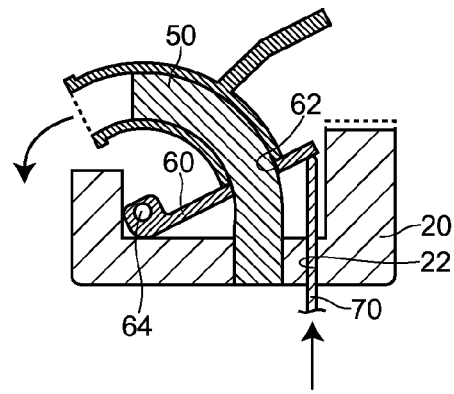
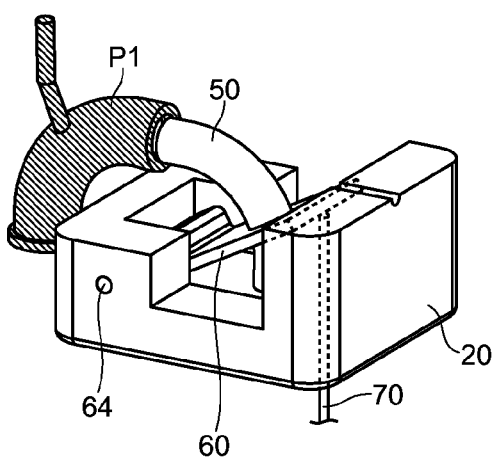
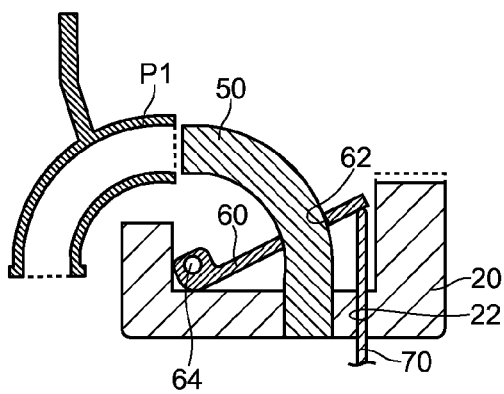

MOLDING DEVICE AND METHOD OF MANUFACTURING MOLDED PRODUCT

RELATED APPLICATIONS

The present application is a National Phase of International Application Number PCT/JP2012/063724, filed May 29, 2012, which claims priority to Japanese Application Number 2011-122360 filed May 31, 2011.

BACKGROUND OF THE INVENTION

1. Field of the Invention

The present invention relates to a molding device and a method of manufacturing a molded product.

2. Description of the Related Art

Conventionally, in the technical field of molding (various cast moldings, injection molding and the like), a technique has been well-known where molding is performed using a core for manufacturing a molded product having an inner space. When the internal shape of a molded product is simple, the molded product can be molded and removed using a simple molding device even when a core is used. However, with respect to a molded product having an inner space bent in a circular arc shape as in the case of a part used as an intake manifold or the like, for example, a core and a molded product interfere with each other so that it is difficult to mold and remove a molded product using a simple molding device.

Conventionally, there has been known a molding device for manufacturing a molded product such as the above-mentioned molded product, that is, a molded product having an inner space bent in a circular arc shape (see JP-A-8-276259 (patent literature 1), for example).

FIG. 18A and FIG. 18B are views for explaining a conventional molding device 900. FIG. 18A is a perspective view of the molding device 900 after the molding is finished, and FIG. 18B is a side view of a core 930, a support member 940 and an ejector pin 950.

The conventional molding device 900 is, as shown in FIG. 18A and FIG. 18B, formed of a set of molds which is joinable to and separable from each other. The molding device 900 includes: a set of molds 910, 920 which can form a cavity having a shape corresponding to an outer shape of a molded product P0 in a state where the molds are joined to each other at the time of molding; a core 930 which has an outer shape corresponding to an inner shape of the molded product P0 and is used in a state where the core 930 is arranged in the cavity which the set of molds 910, 920 forms at the time of molding; a support member 940 which supports the core 930 from the outside; and an ejector pin 950 which is extensible and retractable one-dimensionally along the direction perpendicular to the direction along which the set of molds 910, 920 is separated from each other and ejects the molded product P0 formed around the core 930.

According to the conventional molding device 900, one set of molds 910, 920 is separated after molding. Then, the core 930 and the molded product P0 are separated from the mold 920 together with the support member 940. Thereafter, the molded product P0 is ejected by the ejector pin 950. Accordingly, the molded product P0 having an inner space bent in a circular arc shape can be removed.

SUMMARY OF THE INVENTION

However, the conventional molding device has a drawback that it is difficult for the molding device to suppress the generation of flaws on a molded product when the molded product is removed.

The present invention has been made to overcome the above-mentioned drawback, and it is an object of the present invention to provide a molding device can suppress the generation of flaws on a molded product having an inner space bent in a circular arc shape when the molded product is removed.

It is another object of the present invention to provide a method of manufacturing a molded product capable of suppressing the generation of flaws on a molded product having an inner space bent in a circular arc shape when the molded product is removed.

Inventors of the present invention have extensively studied the difficulty in suppressing the generation of flaws on a molded product when the molded product is removed in a conventional molding device. As a result of the study, the inventors have found that flaws are generated on the molded product due to the increase of the resistance between the molded product and the core caused by the ejection of the molded product using an ejector pin which extends or retracts one-dimensionally and the concentration of a pressure within a range where the ejector pin comes into contact with the molded product. Accordingly, the inventors of the present invention have come up with an idea of decreasing the resistance between the molded product and the core using the movement of the molded product which follows a circular arc shape or dispersing a pressure applied to the molded product using a plate instead of the pin, and have completed the present invention have made as a result of further extensible studies.

The present invention includes the following constitutional technical features.

(1) According to one aspect of the present invention, there is provided a molding device for manufacturing a molded product having an inner space bent in a circular arc shape. The molding device includes a set of molds which is joinable to and separable from each other, the set of molds being capable of forming a cavity having a shape corresponding to an outer shape of the molded product in a joined state at the time of molding; a core which has an outer shape corresponding to an inner shape of the molded product, and is used in a state where the core is arranged in the inside of the cavity which the set of molds forms at the time of molding; and an ejector plate which has a core through hole through which the core passes, and ejects the molded product formed around the core along the circular arc shape in a separated state where the set of molds is separated from each other.

In this manner, the molding device according to the present invention includes the set of molds, the core and the ejector plate having the above-mentioned constitution and hence, in the same manner as conventional molding devices, a molded product having an inner space bent in a circular arc shape can be removed.

According to the above-mentioned molding device of the present invention, the ejector plate which ejects the molded product formed around the core along a circular arc shape is used and hence, the resistance between the molded product and the core can be decreased by making use of the movement of the molded product along the circular arc shape. As a result, the molded product can be removed more smoothly than the conventional molding devices remove.

Further, according to the molding device of the present invention, the molded product is ejected using the ejector plate instead of the ejector pin and hence, a pressure applied to the molded product can be dispersed. Also from this point of view, the molded product can be removed more smoothly than the conventional molding devices remove.

Accordingly, the molding device of the present invention can remove the molded product more smoothly than the conventional molding devices remove, and can suppress the generation of flaws on a molded product having an inner space bent in a circular arc shape when the molded product is removed.

The molding device of the present invention can be used in moldings (various moldings by casting, injection molding and the like) where various kinds of molding materials such as a molding material made of metal or a molding material made of a resin is used.

The molding device of the present invention can be used preferably particularly in the field of injection molding or die cast molding.

"is joinable to and separable from each other" includes a state where the set of molds can be opened or closed in one direction. "a joined state" means a closed state, and "a separated state" means an open state.

"a circular arc shape" means not only a circular arc shape in the strict meaning of the term but also a shape close to the circular arc shape (a curve which follows an elliptical shape, a shape where a straight line is added to an end portion of a circular arc shape or the like, for example). Accordingly, the core used in the molding device of the present invention is not limited to a strictly circular arc curved shape.

"core through hole" means not only a hole which is formed in a state where the core through hole completely surrounds the core but also a hole which is formed in a state where the core through hole surrounds a part of the core (see a modification described later).

It is sufficient for the ejector plate of the present invention to eject the molded product to a position where the molded product is separable from the core. Accordingly, it is unnecessary to eject the molded product to a position where the ejector plate reaches a distal end portion of the core, while it is sufficient for the ejector plate to reach a position away from a proximal end portion of the core by an appropriate amount.

The set of molds according to the present invention may be so-called slide molds or a so-called set of a fixed-side mold and a movable-side mold.

(2) In the molding device of the present invention, it is preferable that the ejector plate is rotatable about a rotary shaft perpendicular to a plane along the circular arc shape.

Due to such a constitution, a molded product can be ejected along the circular arc shape.

"rotatable" means not only the movement strictly along the circular arc shape but also the movement which approximates the circular arc shape (the movement in a curved shape following an elliptical shape or the movement constituted of the slightly linear movement and the circular arc movement which follows the linear movement, for example). To make the ejector plate perform the movement which approximates the circular arc shape, for example, the mechanism which uses a cam may be adopted.

(3) In the molding device of the present invention, it is preferable that the molding device further includes an ejector plate rotating pin which is extensible and retractable in the direction perpendicular to rotary shaft, and rotates the ejector plate by pushing.

Due to such a constitution, the ejector plate can be rotated using a simple method that the ejector plate rotating pin is extended or retracted in the direction perpendicular to rotary shaft.

(4) In the molding device of the present invention, it is preferable that the molding device further includes an ejector plate pull-back pin which is connected to the ejector plate and is configured to return the ejector plate to a position before molding by rotating the ejector plate by pulling after the ejector plate rotating pin rotates the ejector plate by pushing.

Due to such a constitution, the ejector plate can be pulled back after the ejector plate rotating pin ejects the ejector plate.

(5) In the molding device of the present invention, it is preferable that the molding device further includes an extending and retracting mechanism which is extensible and retractable in the direction perpendicular to the rotary shaft, the ejector plate rotating pin is directly mounted on the extending and retracting mechanism, and the ejector plate pull-back pin is mounted on the extending and retracting mechanism with an elastic body sandwiched therebetween.

Due to such a constitution, in view of the characteristic of the above-mentioned extending and retracting mechanism that the mechanism is used popularly in the molding device provided with molds, the increase of the number of parts in the molding device can be suppressed. As a result, it is possible to prevent a manufacturing cost of the molding device from being pushed up.

Further, due to such a constitution, the ejector plate rotating pin is directly mounted on the extending and retracting mechanism. Accordingly, the ejector plate can be surely ejected by making use of the movement of the extending and retracting mechanism.

Still further, due to such a constitution, the ejector plate pull-back pin is mounted on the extending and retracting mechanism with the elastic body sandwiched therebetween. Accordingly, the difference between an extending amount and a retracting amount caused by the difference in position between the ejector plate rotating pin and the ejector plate pull-back pin is absorbed by the elastic body and hence, the extending and retracting of the ejector plate can be performed in a stable manner.

Still further, due to such a constitution, even when there exists a small error in the movement of the extending and retracting mechanism, the elastic body absorbs such an error and hence, it is possible to surely return the ejector plate to the position before molding.

In the above-mentioned constitutions (4) and (5), it is preferable that, in rotating the ejector plate by ejecting, a force with which the ejector plate pull-back pin pushes the ejector plate is smaller than a force with which the ejector plate rotating pin ejects the ejector plate. Due to such a constitution, a force which is applied to a connection portion between the ejector plate and the ejector plate pull-back pin can be suppressed and hence, it is possible to prevent the connection portion from being broken.

(6) In the molding device of the present invention, it is preferable that the molding device further includes a fixed-side mold and a movable-side mold which is joinable to and separable from each other along the direction different from the set of molds, the fixed-side mold and the movable-side mold capable of sandwiching the set of molds therebetween when the fixed-side mold and the movable-side mold are joined to each other.

Due to such a constitution, it is possible to remove a molded product having an inner space bent in a circular arc shape by making use of a conventionally known drive mechanism of a molding device which uses a fixed-side mold and a movable-side mold.

Further, due to such a constitution, when the molding device further includes the ejector plate rotating pin described in the above-mentioned constitution (3), it is possible to make use of the extending and retracting mechanism for extending or retracting a generally used ejector pin (a pin used for ejecting a molded product from a mold) which is arranged on a fixed-side mold side or a movable-side mold side. Accordingly, a molded product can be removed without preparing a particular device for extending or retracting the ejector plate rotating pin.

In the molding device having the above-mentioned constitution (6), the set of molds is joinable to and separable from each other along the direction different from the fixed-side mold or the movable mode and hence, so-called slide molds can be preferably used.

(7) In the molding device of the present invention, it is preferable that a proximal end portion of the core is mounted on the movable-side mold, and the molded product is ejected in a state where a distal end portion of the core is positioned above the proximal end portion of the core.

Due to such a constitution, a machine which receives a molded product such as a robot hand can easily receive the molded product after the molded product is ejected and hence, it is possible to remove the molded product without falling the molded product.

In this case, it is preferable to use a jig which prevents the deviation of the position or the direction of a molded product which starts to be removed from the mold. Due to such a constitution, the machine can efficiently receive the molded product thus enabling the more reliable removal of the molded product without falling the molded product.

(8) In the molding device of the present invention, it is preferable that the ejector plate is configured to face the cavity at the time of molding thus forming an outer shape of the molded product together with the set of molds.

Due to such a constitution, it is possible to suppress leakage of a molten material which may occur due to the use of the ejector plate.

Further, due to such a constitution, the ejector plate is used as a part of the mold and hence, the set of molds can be made lightweight.

(9) In the molding device of the present invention, it is preferable that the ejector plate is separated from the cavity at the time of molding.

Also due to such a constitution, it is possible to suppress leakage of a molten material which may occur due to the use of the ejector plate.

When the molding device has the above-mentioned constitution, the set of molds is configured to form an outer shape of a molded product without using the ejector plate. Accordingly, due to the above-mentioned constitution, it is possible to maintain the quality of a molded product without strictly performing the positioning between the set of molds and the ejector plate at the time of molding.

(10) In the molding device of the present invention, it is preferable that a refrigerant flow path is formed in the inside of the ejector plate.

In the technical field of molding devices, a refrigerant flow path is formed in the inside of a mold for enhancing productivity of molded products or for enhancing the quality of molded products.

Due to such a constitution, also when the ejector plate which is a constitutional element other than the molds is used as in the case of the molding device of the present invention, productivity of molded products can be enhanced and the quality of molded products can be enhanced.

The ejector plate in which the refrigerant flow path is formed can be manufactured by bonding or adhering constitutional parts on which a refrigerant flow path forming groove is formed to each other, for example. As the method of bonding these constitutional parts to each other, for example, it is possible to use (a) a bonding method that constitutional parts to be bonded on which a refrigerant flow path forming groove is formed are bonded on a planar joining plane (see JP-A-2007-61867), (b) a bonding method that constitutional parts to be bonded are bonded to each other and, thereafter, predetermined bonding strength reinforcing treatment is performed (see International Publication WO2007/108058 and International Publication WO2008/004311), (c) a bonding method that constitutional parts to be bonded are bonded to each other in a state where a carbon felt is arranged between respective electrodes of an electric heating device and the respective constitutional parts to be bonded (see International Publication WO2008/044776), (d) a bonding method that constitutional parts to be bonded are bonded to each other in a state where a thin plate-like steel member or another steel member is interposed between the constitutional parts to be bonded (see International Publication WO2008/129622) or the like.

As the method of adhering constitutional parts on which a refrigerant flow path forming groove is formed to each other, for example, it is possible to use an adhesion method that the constitutional parts are adhered to each other using a heat-resistant adhesive agent (see International Publication WO2006/030503) or the like.

In the molding device having the above-mentioned constitution (10), it is more preferable that the refrigerant flow path formed in the inside of the ejector plate can cool the ejector plate even when the ejector plate is rotated.

(11) In the molding device of the present invention, it is preferable that a refrigerant flow path is formed in the inside of the core.

Due to such a constitution, even when the core which is the constitutional element other than the molds is used as in the case of the molding device of the present invention, the productivity can be enhanced and the quality of a molded product can be enhanced, The core in which the refrigerant flow path is formed may be, for example, manufactured by joining or adhering constitutional parts on each of which grooves for refrigerant flow path are formed to each other.

(12) According to a second aspect of the present invention, there is provided a method for manufacturing a molded product having an inner space bent in a circular arc shape, the method including in the following order: a forming step where the molded product is formed between a set of molds which is capable of forming a cavity having a shape corresponding to an outer shape of the molded product in a state where the molds are joined to each other and a core having a shape corresponding to an inner shape of the molded product; a mold separating step where the set of molds are separated from the molded product so as to exposed the molded product; and an ejecting step where the molded product formed around the core is ejected along the circular arc shape using an ejector plate.

According to the method for manufacturing a molded product of the present invention, the method includes the ejecting step where the molded product formed around the core is ejected along a circular arc shape using the ejector plate and hence, the resistance between a molded product and the core can be decreased by making use of the movement of the molded product along the circular arc shape, and a pressure applied to the molded product can be dispersed using the ejector plate instead of the ejector pin. Accordingly, the molding device of the present invention can remove a molded product more smoothly than conventional molding devices remove. As a result, the method of manufacturing a molded product according to the embodiment 1 can suppress the generation of flaws on a molded product having an inner space bent in a circular arc shape when a molded product is removed.

The method for manufacturing a molded product of the present invention is applicable to molding (various cast moldings, injection molding and the like) which uses various molding materials such as a molding material made of metal or a molding material a resin.

The method for manufacturing a molded product of the present invention is preferably used particularly in a field of injection molding and die cast molding.

BRIEF DESCRIPTION OF DRAWINGS

FIG. 2A1 to FIG. 2B2 are views for explaining the manner of operation of an ejector plate 60 in the embodiment 1.

FIG. 3 is a perspective view of the ejector plate 60 in the embodiment 1.

FIG. 5A1 to FIG. 5C2 are views for explaining the method of manufacturing a molded product according to the embodiment 1.

FIG. 6A1 to FIG. 6C2 are views for explaining the method of manufacturing a molded product according to the embodiment 1.

FIG. 7A1 to FIG. 7B2 are views for explaining the method of manufacturing a molded product according to the embodiment 1.

DESCRIPTION OF PREFERRED EMBODIMENTS

Figure 1A:
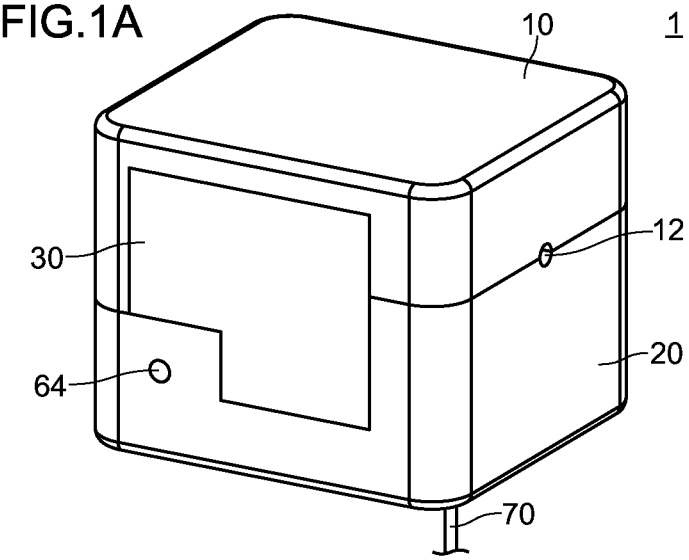
FIG. 1A to FIG. 1C are views for explaining a molding device 1 according to an embodiment 1.

Hereinafter, a molding device and a method of molding a molded product of the present invention are explained in conjunction with embodiments shown in the drawings.

[Embodiment 1]

1. Constitution of Molding Device

Firstly, the constitution of a molding device 1 according to an embodiment 1 is explained.

Figure 1B:
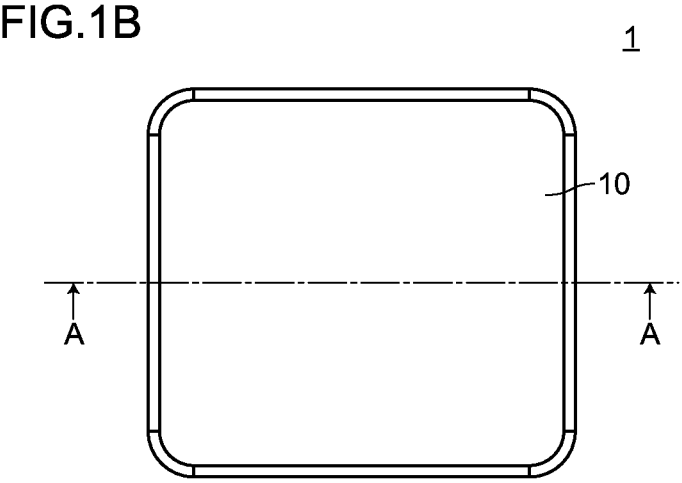
Figure 1C:
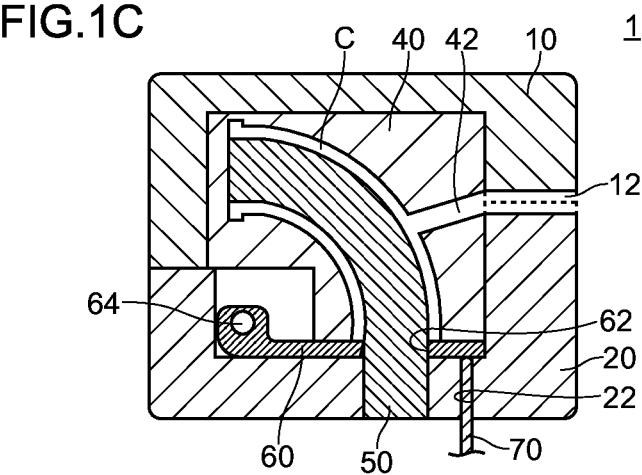

FIG. 1A to FIG. 1C are views for explaining the molding device 1 according to the embodiment 1. FIG. 1A is a perspective view of the molding device 1, FIG. 1B is a top plan view of the molding device 1, and FIG. 1C is a cross-sectional view taken along a line A-A in FIG. 1B. In this specification and respective drawings, out of constitutional elements of an actual molding device, only constitutional elements of the molding device relating to the present invention are explained and illustrated, and the explanation and the illustration of other constitutional elements are omitted.

FIG. 2A1 to FIG. 2B2 are views for explaining the manner of operation of an ejector plate 60 in the embodiment 1. FIG. 2A1 is a perspective view for explaining the arrangement of the ejector plate 60 at the time of molding, FIG. 2A2 is a cross-sectional view of the structure shown in FIG. 2A1, FIG. 2B1 is a perspective view for explaining an arrangement of the ejector plate 60 at the time of ejecting a molded product, and FIG. 2B2 is a cross-sectional view of the structure shown in FIG. 2B1. FIG. 2A2 and FIG. 2B2 are cross-sectional views corresponding to FIG. 1C. In FIG. 2B1 and FIG. 2B2, the ejector plate 60 is shown in a state where the ejector plate 60 is largely rotated to facilitate the explanation of the structure. The same goes for FIG. 7, FIG. 11B, FIG. 12D and FIG. 12E described later. In an actual use of the molding device, it is sufficient that an ejector plate is rotated to an extent that a molded product can be removed from a core.

FIG. 3 is a perspective view of the ejector plate 60 according to the embodiment 1.

The molding device 1 according to the embodiment 1 is a molding device for manufacturing a molded product P1 having an inner space bent in a circular arc shape. The molding device 1 includes, as shown in FIG. 1, a fixed-side mold 10, a movable-side mold 20, a set of molds 30, 40, a core 50, the ejector plate 60, and an ejector plate rotating pin 70. The molding device 1 is an injection molding device used for injection molding, for example.

The fixed-side mold 10 and the movable-side mold 20 are joinable to or separable from each other in the direction different from the joining and separating direction of the set of molds 30, 40 (see FIG. 5C1 and FIG. 5C2 described later), and can sandwich the set of molds 30, 40 therebetween when the fixed-side mold 10 and the movable-side mold 20 are joined to each other.

In the molding device 1, while the fixed-side mold 10 is fixed, the movable-side mold 20 is movable in the vertical direction by a drive mechanism not shown in the drawing. Symbol 12 indicates a runner which is formed when the fixed-side mold 10 and the movable-side mold 20 are joined to each other.

The movable-side mold 20 includes a hole 22 for ejector plate rotating pin through which the ejector plate rotating pin 70 passes.

The set of molds 30, 40 are joinable to and separable from each other, and are joined to each other at the time of molding so as to form a cavity C having a shape corresponding to an outer shape of the molded product P1. The set of molds 30, 40 are respectively formed of a so-called slide mold. In FIG. 1C, symbol 42 indicates a runner which is formed when the set of molds 30, 40 are joined to each other.

The core 50 has an outer shape corresponding to an inner shape of the molded product P1. The core 50 is used in a state being arranged in the cavity C which the set of molds 30, 40 forms at the time of molding. The core 50 a proximal end portion thereof mounted on the movable-side mold 20 at. Accordingly, as described later, the molding device 1 is configured such that the molding device 1 ejects the molded product P1 in a state where a distal end portion of the core 50 is arranged above the proximal end portion of the core 50 (see FIG. 7A1 and FIG. 7A2 described later). Although the explanation using drawings is omitted, in this case, it is preferable to use a jig which can prevent the displacement in position and removing direction of the molded product P1 which starts to be removed from the molds. Due to such a constitution, it is possible to efficiently receive a molded product, and it is also possible to remove the molded product more reliably without falling the molded product.

As the core, it is also possible to use a core having a large draft angle by taking into account the easiness of e removal of the core. Further, as the core, it is also possible to use a core which is bent in a curved shape along an ellipse, a core which is bent along a shape which is formed by adding a straight line to an end portion of a circular arc shape or the like.

As shown in FIG. 1 to FIG. 3, the ejector plate 60 has a core through hole 62 through which the core 50 passes (see FIG. 3). After the molding operation, in a state where the set of molds 30, 40 are separated from each other, the ejector plate 60 ejects the molded product P1 formed around the core 50 along a circular arc shape (see FIG. 7A1 and FIG. 7A2 described later). The ejector plate 60 is mounted on the movable-side mold 20 by way of a rotary shaft 64. The core through hole 62 is formed in a state where the core through hole 62 completely surrounds the core 50.

As shown in FIG. 2, the ejector plate 60 is configured to be rotatable about the rotary shaft 64 which is arranged perpendicular to a plane along the circular arc shape. In the embodiment 1, the ejector plate 60 is joined to the movable-side mold 20 by a resilient member not shown in the drawing, and is configured such that the ejector plate 60 smoothly returns to a state shown in FIG. 2A1 and FIG. 2A2 when the ejector plate 60 is not pushed by the ejector plate rotating pin 70. For example, a spring may be used as the resilient member.

As shown in FIG. 1, the ejector plate 60 is configured such that the ejector plate 60 faces the cavity C and forms an outer shape of the molded product P1 together with the set of molds 30, 40 at the time of molding.

As shown in FIG. 1 and FIG. 2, the ejector plate rotating pin 70 is extensible and retractable in the direction perpendicular to the rotary shaft 64 and rotates the ejector plate 60 by pushing. The ejector plate rotating pin 70 is extensible and retractable in the direction parallel to the movable direction of the movable-side mold 20, and is connected to a mechanism not shown in the drawing which extends or retracts the ejector plate rotating pin 70. Only one ejector plate rotating pin may be provided or two or more ejector plate rotating pins may be provided.

2. Method of Manufacturing Molded Product

Next, a method of manufacturing a molded product according to the embodiment 1 is explained.

Figure 4:
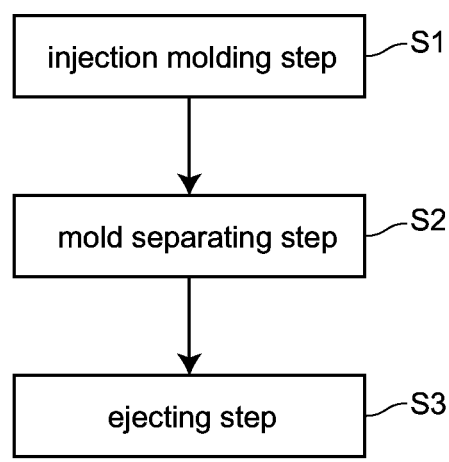
FIG. 4 is a flowchart for explaining a method of manufacturing a molded product according to the embodiment 1.

FIG. 4 is a flowchart for explaining the method of manufacturing a molded product according to the embodiment 1.

FIG. 5A1 to FIG. 7B2 are views for explaining the method of manufacturing a molded product according to the embodiment 1. FIG. 5A1 to FIG. 5C1, FIG. 5A2 to FIG. 5C2, FIG. 6A1 to FIG. 6C1, FIG. 6A2 to FIG. 6C2, FIG. 7A1 to FIG. 7B1, FIG. 7A2 to FIG. 7B2 are views showing manufacturing steps respectively. FIG. 5A1 to FIG. 5C1, FIG. 6A1 to FIG. 6C1, and FIG. 7A1 to FIG. 7B1 are perspective views, and FIG. 5A2 to FIG. 5C2, FIG. 6A2 to FIG. 6C2, and FIG. 7A2 to FIG. 7B2 are cross-sectional views corresponding to the perspective views arranged on a left side of the cross-sectional views.

The method of manufacturing a molded product according to the embodiment 1 is a method of manufacturing a molded product for manufacturing a molded product having an inner space bent in a circular arc shape, and is carried out using the molding device 1 according to the embodiment 1. As shown in FIG. 4, the method of manufacturing a molded product according to the embodiment 1 includes a molding step S1, a mold separating step S2, and an ejecting step S3 in this order.

The molding step S1 is a step where a molded product is formed between the set of molds 30, 40 which can form the cavity C having a shape corresponding to an outer shape of the molded product P1 in a state the molds 30, 40 are joined to each other and the core 50 having an outer shape corresponding to an inner shape of the molded product P1.

Firstly, as shown in FIG. 5A1 and FIG. 5A2, the set of molds 30, 40 are joined to each other. Then, the fixed-side mold 10 and the movable-side mold 20 are joined to each other. In such a state, as shown in FIG. 5B1 and FIG. 5B2, a molding material is injected into the cavity C through the runner 12.

The mold separating step S2 is a step where the set of molds 30, 40 are separated from the molded product P1 thus exposing the molded product P1 to the outside.

Firstly, the movable-side mold 20 is moved in the direction (downward direction) indicated by an arrow shown in FIG. 5C1 and FIG. 5C2 so that the fixed-side mold 10 and the movable-side mold 20 are separated from each other. As shown in FIG. 6A1 and FIG. 6A2, the set of molds 30, 40 are also moved downward together with the movable-side mold 20. Next, the set of molds 30, 40 are made to slide in the directions (sideward directions) indicated by arrows shown in FIG. 6B1 and FIG. 6B2 so that the set of molds 30, 40 are separated from the molded product P1. Due to such an operation, as shown in FIG. 6C1 and FIG. 6C2, the molded product P1 which is formed around the core 50 can be exposed.

In the ejecting step S3 is a step where the molded product P1 which is formed around the core 50 is ejected along a circular arc shape using the ejector plate 60. From a state shown in FIG. 7A1 and FIG. 7A2, the ejector plate rotating pin 70 is projected in the direction perpendicular to the rotary shaft 64 so that the ejector plate rotating pin 70 rotates the ejector plate 60 by pushing. Due to such an operation, as shown in FIG. 7B1 and FIG. 7B2, the molded product P1 can be removed. This removing operation is performed using a machine for receiving a molded product such as a robot hand.

In the method of manufacturing a molded product according to the embodiment 1, as shown in FIG. 7B1 and FIG. 7B2, portions formed of the molding material which is solidified in the runner 42 and the runner 12 are adhered to the molded product P1. However, these portions can be easily removed by post processing such as grinding.

3. Advantageous Effects of Molding Device 1 and Method of Manufacturing Molded Product Next, advantageous effects of the molding device 1 and the method of manufacturing a molded product according to the embodiment 1 are explained.

The molding device 1 according to the embodiment 1 includes the set of molds 30, 40, the core 50, and the ejector plate 60. Accordingly, in the same manner as conventional molding devices, a molded product having an inner space bent in a circular arc shape can be removed.

The molding device 1 of the embodiment 1 uses the ejector plate 60 which ejects the molded product P1 formed around the core 50 along a circular arc shape. Accordingly, the resistance between the molded product and the core can be decreased by making use of the movement of the molded product along the circular arc shape. As a result, according to the molding device 1 of the embodiment 1, the molded product can be removed more smoothly than conventional molding devices remove.

Further, according to the molding device 1 of the embodiment 1, the molded product is ejected using the ejector plate 60 instead of the ejector pin and hence, a pressure applied to the molded product can be dispersed. Also from this point of view, the molded product can be removed more smoothly than the conventional molding devices remove.

Accordingly, the molding device 1 of the embodiment 1 can remove a molded product more smoothly than the conventional molding devices remove, and can suppress the generation of flaws on a molded product having an inner space bent in a circular arc shape when the molded product is removed.

According to the molding device 1 of the embodiment 1, the ejector plate 60 is rotatable about a rotary shaft 64 perpendicular to a plane along the circular arc shape and hence, a molded product can be ejected along the circular arc shape.

According to the molding device 1 of the embodiment 1, the molding device 1 further includes the ejector plate rotating pin 70 which is extensible and retractable in the direction perpendicular to rotary shaft 64, and rotates the ejector plate 60 by pushing and hence, the ejector plate can be rotated using a simple method that the ejector plate rotating pin is extended or retracted in the direction perpendicular to rotary shaft.

According to the molding device 1 of the embodiment 1, the molding device 1 further includes the fixed-side mold 10 and the movable-side mold 20 which are joinable to or separable from each other along the direction different from the set of molds 30, 40, and can sandwich the set of molds 30, 40 therebetween when the fixed-side mold 10 and the movable-side mold 20 are joined to each other. Accordingly, it is possible to remove a molded product having an inner space bent in a circular arc shape by making use of a conventionally known drive mechanism of a molding device which uses a fixed-side mold and a movable-side mold.

According to the molding device 1 of the embodiment 1, it is possible to make use of an extending and retracting mechanism for extending or retracting a general-use ejector pin (a pin used for ejecting a molded product from a mold). Accordingly, a molded product can be removed without preparing a particular device for extending or retracting the ejector plate rotating pin.

According to the molding device 1 of the embodiment 1, a proximal end portion of the core 50 is mounted on the movable-side mold 20, and a distal end portion of the core 50 is configured to eject a molded product P1 in a state where the distal end portion of the core 50 is positioned above the proximal end portion of the core 50. Accordingly, a machine which receives a molded product such as a robot hand can easily receive the molded product after the molded product is ejected and hence, it is possible to remove the molded product without causing falling of the molded product.

According to the molding device 1 of the embodiment 1, the ejector plate 60 is configured to face the cavity C and forms an outer shape of the molded product P1 together with the set of molds 30, 40 at the time of molding. Accordingly, it is possible to suppress leakage of a molten material which may occur due to the use of the ejector plate 60.

Further, according to the molding device 1 of the embodiment 1, the ejector plate 60 is used as a part of the mold and hence, the set of molds can be miniaturized and can be made lightweight.

Further, the method of manufacturing a molded product according to the embodiment 1 includes the ejecting step S3 where the molded product P1 formed around the core 50 is ejected along a circular arc shape using the ejector plate 60 and hence, the resistance between a molded product and the core can be decreased by making use of the movement of the molded product along the circular arc shape, and a pressure applied to the molded product can be dispersed using the ejector plate instead of the ejector pin. Accordingly, the molding device of the present invention can remove a molded product more smoothly than conventional molding devices remove. As a result, the method of manufacturing a molded product according to the embodiment 1 can suppress the generation of flaws on a molded product having an inner space bent in a circular arc shape when a molded product is removed.

[Embodiment 2]

Figure 8A:
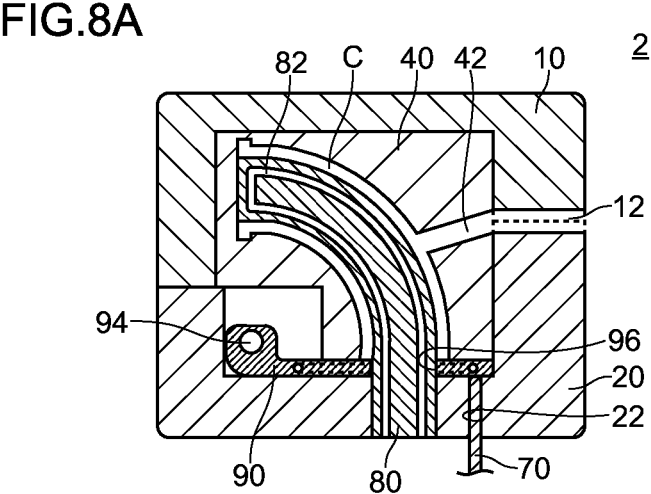
FIG. 8A to FIG. 8C are views for explaining a molding device 2 according to an embodiment 2.
Figure 8B:
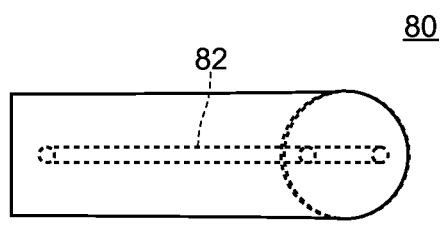
Figure 8C:
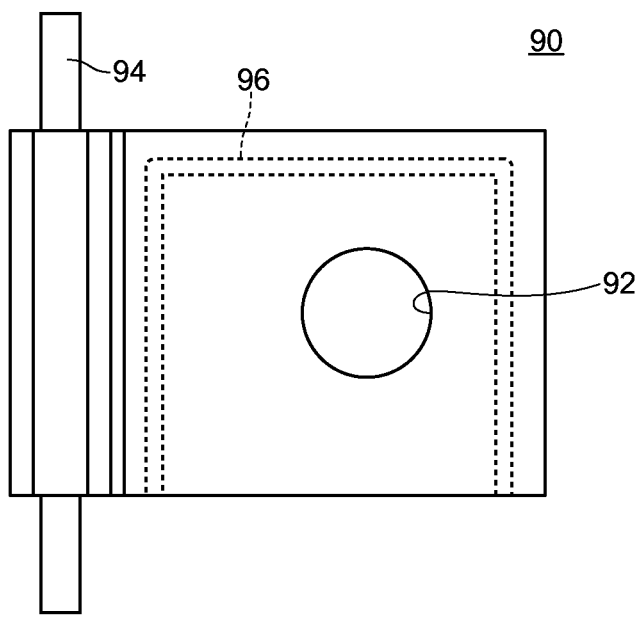

FIG. 8A to FIG. 8C are views for explaining a molding device 2 according to an embodiment 2. FIG. 8A is a cross-sectional view of the molding device 2, FIG. 8B is a top plan view of a core 80, and FIG. 8C is a top plan view of an ejector plate 90. FIG. 8A is a cross-sectional view corresponding to FIG. 1C.

Although the molding device 2 according to the embodiment 2 basically has the substantially same constitution as the molding device 1 according to the embodiment 1, the molding device 2 according to the embodiment 2 differs from the molding device 1 according to the embodiment 1 with respect to the constitution of a core and the constitution of an ejector plate. That is, in the molding device 2 according to the embodiment 2, as shown in FIG. 8, a refrigerant flow path 82 is formed in the inside of a core 80, and a refrigerant flow path 96 is formed in the inside of an ejector plate 90.

For example, water may flow in the refrigerant flow path 80. A refrigerant flow path may be formed in other constitutional elements besides the core and the ejector plate although the constitution is not shown in the drawing and the detailed explanation is omitted. In this case, it is preferable that the refrigerant flow path formed in the ejector plate and at least one of refrigerant flow paths formed in other constitutional elements are communicated with each other at the time of molding.

In this manner, the molding device 2 according to the embodiment 2 differs from the molding device 1 according to the embodiment 1 with respect to the constitution of the core and the constitution of the ejector plate. However, the molding device 2 according to the embodiment 2 also uses the ejector plate 90 which ejects a molded product P1 formed around the core 80 along a circular arc shape. Accordingly, in the same manner as the molding device 1 according to the embodiment 1, the molding device 2 can remove a molded product more smoothly than conventional molding devices remove whereby it is possible to provide the molding device which can suppress the generation of flaws on a molded product when the molded product is removed.

According to the molding device 2 of the embodiment 2, the refrigerant flow path 96 is formed in the inside of the ejector plate 90. Accordingly, also when the ejector plate which is a constitutional element other than the molds is used, productivity of molded products can be enhanced and quality of molded products can be enhanced.

Further, according to the molding device 2 of the embodiment 2, the refrigerant flow path 82 is formed in the inside of the core 80 and hence, also when the core 80 which is a constitutional element other than the molds is used, productivity of molded products can be enhanced and the quality of molded products can be enhanced.

The molding device 2 according to the embodiment 2 has the substantially same constitution as the molding device 1 according to the embodiment 1 other than the constitution of the core and the constitution of the ejector plate. Accordingly, out of the advantageous effects which the molding device 1 according to the embodiment 1 acquires, the molding device 2 according to the embodiment 2 acquires the exactly same advantageous effects as the molding device 1 according to the embodiment 1 with respect to the constitutional parts of the molding device 2 according to the embodiment 2 which are equal to the constitutional parts of the molding device 1 according to the embodiment 1.

[Embodiment 3]

Figure 9:
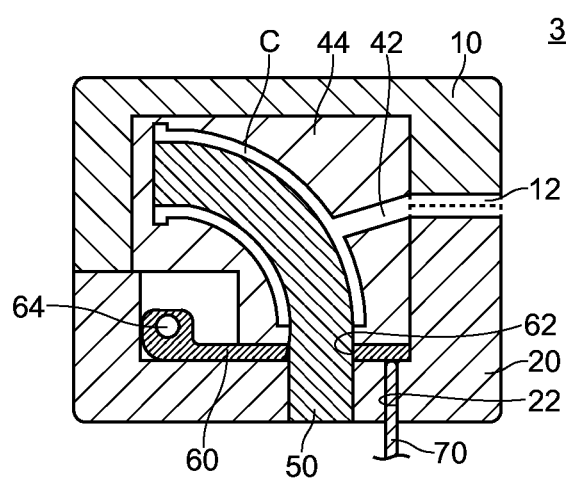
FIG. 9 is a cross-sectional view for explaining a molding device 3 according to an embodiment 3.

FIG. 9 is a cross-sectional view for explaining a molding device 3 according to an embodiment 3. FIG. 9 is a cross-sectional view corresponding to FIG. 1C of the embodiment 1.

Although the molding device 3 according to the embodiment 3 basically has the substantially same constitution as the molding device 1 according to the embodiment 1, the molding device 3 according to the embodiment 3 differs from the molding device 1 according to the embodiment 1 with respect to the constitution of a set of molds and the constitution of an ejector plate. That is, in the molding device 3 of the embodiment 3, as shown in FIG. 9, an ejector plate 60 is separated from a cavity C at the time of molding. That is, a set of molds constituted of a mold 34 (not shown in the drawing) and a mold 44 forms an outer shape of a molded product without using the ejector plate 60.

In this manner, the molding device 3 according to the embodiment 3 differs from the molding device 1 according to the embodiment 1 with respect to the constitution of the set of molds and the constitution of the core. However, the molding device 3 according to the embodiment 3 uses the ejector plate 60 which ejects a molded product formed around the core 80 along a circular arc shape and hence, in the same manner as the molding device 1 according to the embodiment 1, the molding device 3 can remove a molded product more smoothly than conventional molding devices remove. Accordingly, it is possible to provide the molding device which can suppress the generation of flaws on a molded product when the molded product is removed.

According to the molding device 3 of the embodiment 3, the ejector plate 60 is configured to be separated from the cavity C at the time of molding and hence, it is possible to suppress a leakage of a molten material which may occur due to the use of the ejector plate.

According to the molding device 3 of the embodiment 3, it is possible to maintain the quality of a molded product even when the set of molds and the ejector plate are not strictly positioned at the time of molding.

The molding device 3 according to the embodiment 3 has the substantially same constitution as the molding device 1 according to the embodiment 1 other than the constitution of the set of molds and the constitution of the ejector plate. Accordingly, out of the advantageous effects which the molding device 1 according to the embodiment 1 acquires, the molding device 3 according to the embodiment 3 acquires the exactly same advantageous effects as the molding device 1 according to the embodiment 1 with respect to the constitutional parts of the molding device 3 according to the embodiment 3 which are equal to the constitutional parts of the molding device 1 according to the embodiment 1.

[Embodiment 4]

Figure 10A:
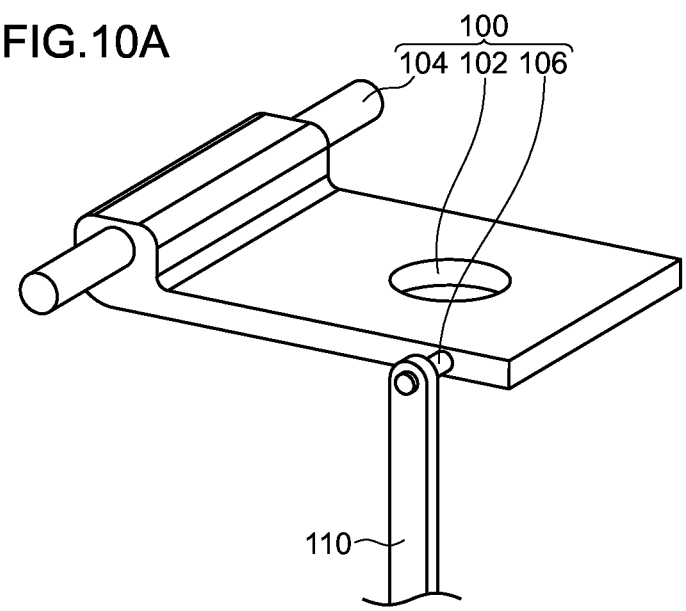
FIG. 10A and FIG. 10B are perspective views for explaining an ejector plate 100 and an ejector plate pull-back pin 110 according to an embodiment 4.
Figure 10B:
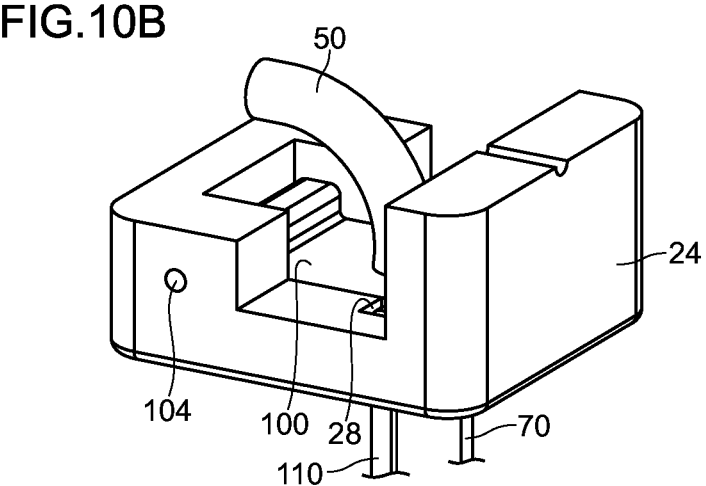

FIG. 10A and FIG. 10B are perspective views for explaining an ejector plate 100 and an ejector plate pull-back pin 110 according to an embodiment 4. FIG. 10A is a perspective view of the ejector plate 100 and the ejector plate pull-back pin 110, and FIG. 10B is a perspective view of a movable-side mold 24, the ejector plate 100, and the ejector plate pull-back pin 110.

Figure 11A:
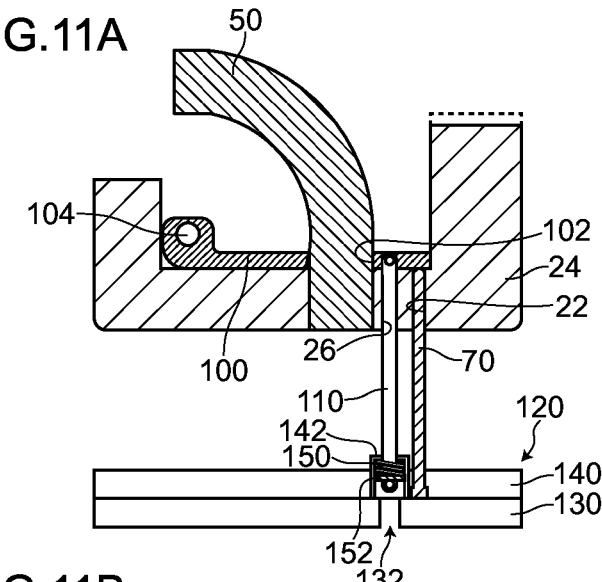
FIG. 11A to FIG. 11C are views for explaining a molding device 4 according to the embodiment 4.
Figure 11B:
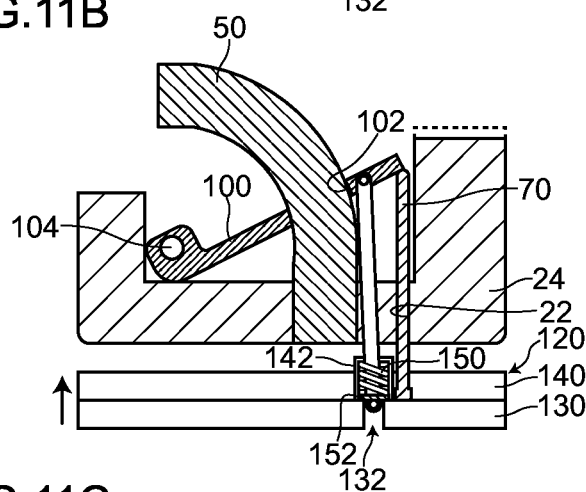
Figure 11C:
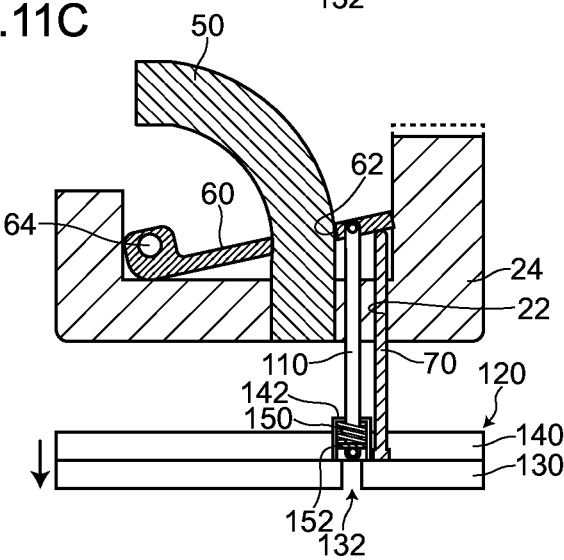

FIG. 11A to FIG. 11C are views for explaining a molding device 4 according to an embodiment 4 (the whole molding device 4 not shown in the drawing). FIG. 11A is a cross-sectional view for explaining the arrangement of the ejector plate 100 at the time of molding, FIG. 11B is a cross-sectional view for explaining the arrangement of the ejector plate 100 at the time of ejecting a molded product, and FIG. 11C is a cross-sectional view for explaining the arrangement of the ejector plate 100 which is pulled back after the ejector plate 100 ejects a molded product. FIG. 11A is a view corresponding to FIG. 2A2 in the embodiment 1, and FIG. 11B is a view corresponding to FIG. 2B2 in the embodiment 1. Although the ejector plate pull-back pin 110 and an ejector plate pull-back pin hole 28 do not appear in cross section shown in FIG. 11A to FIG. 11C, the ejector plate pull-back pin 110 and the ejector plate pull-back pin hole 28 are shown in FIG. 11A to FIG. 11C for facilitating the explanation of constitutional parts.

The molding device 4 according to the embodiment 4 basically has the substantially same constitution as the molding device 1 according to the embodiment 1. However, the molding device 4 according to the embodiment 4 differs from the molding device 1 according to the embodiment 1 with respect to the structure for pulling back an ejector plate. That is, as shown in FIG. 10A and FIG. 10B, and FIG. 11A to FIG. 11C, the molding device 4 according to the embodiment 4 includes the ejector plate pull-back pin 110. Hereinafter, the molding device 4 which includes the ejector plate pull-back pin 110 is explained.

Firstly, constitution elements of the molding device 4 according to the embodiment 4 which differ from the constitutional elements of the molding device 1 according to the embodiment 1 are explained.

As shown in FIG. 10A, one end of the ejector plate pull-back pin 110 is connected to the ejector plate 100. As shown in FIG. 11A to FIG. 11C, the ejector plate pull-back pin 110 is provided for returning the ejector plate 100 to a position before molding by rotating the ejector plate 100 by pulling after the ejector plate rotating pin 70 rotates the ejector plate 110 by pushing.

In the molding device 4 according to the embodiment 4, one ejector plate pull-back pin 110 is provided to only one side of the ejector plate 100. However, the present invention is not limited to such a constitution. For example, two ejector plate pull-back pins 110 in total may be provided to both sides of the ejector plate respectively, that is, one ejector plate pull-back pin 110 may be provided to one side of the ejector plate and the other ejector plate pull-back pin 110 may be provided to the other side of the ejector plate. Further, the molding device 4 according to the embodiment 4 may include two or more ejector plate pull-back pins.

The molding device 4 includes an extending and retracting mechanism 120 which is extensible and retractable in the direction perpendicular to rotary shaft of the ejector plate 100. The extending and retracting mechanism 120 basically has the substantially same constitution as the extending and retracting mechanism not shown in the drawing which is explained during the explanation of the molding device 1. The extending and retracting mechanism 120 includes two plates 130, 140 which are extensible and retractable by an extending and retracting device (for example, a hydraulic cylinder) not shown in the drawing.

The lower plate 130 includes a dampening space 132 for dampening a force which the ejector plate pull-back pin 110 pushes the ejector plate 100.

The upper plate 140 includes an ejector plate rotating pin fixing hole 142 for fixing an ejector plate rotating pin 70, and an elastic body housing portion 144 for housing an elastic body 150 described later.

The ejector plate rotating pin fixing hole 142 is a hole having a size corresponding to the ejector plate rotating pin 70.

A hole for allowing the ejector plate pull-back pin 110 to pass therethrough is formed in the elastic body housing portion 144. A size of the hole is set slightly larger than a width of the ejector plate pull-back pin 110 to cope with the inclination of the ejector plate pull-back pin 110 (the inclination being generated due to the structure where the ejector plate pull-back pin 110 is connected to the rotatable ejector plate 100, see FIG. 11B).

As shown in FIG. 11A to FIG. 11C, the ejector plate rotating pin 70 is directly mounted on the extending and retracting mechanism 120 in a state where a proximal portion of the ejector plate rotating pin 70 is sandwiched between the plates 130, 140.

The ejector plate pull-back pin 110 is mounted on the extending and retracting mechanism 120 with the elastic body 150 sandwiched therebetween. An end portion of the ejector plate pull-back pin 110 on a side opposite to an end portion of ejector plate pull-back pin 110 which is mounted on the ejector plate 100 is connected to an elastic body 150. This connection is acquired by using a lock pin can, for example.

The elastic body 150 is housed in the elastic body housing portion 144 in an extensible and shrinkable manner. The elastic body 150 is connected to a side of the elastic body housing portion 144 near a movable-side mold 24. The elastic body 150 is formed of a spring, for example. A part indicated by symbol 152 is an auxiliary plate provided for improving contact property between the elastic body 150 and the plate 130.

The ejector plate 100 basically has the substantially same constitution as the ejector plate 60 of the embodiment 1. However, the ejector plate 100 of this embodiment 4 further includes a connection portion 106 for connecting the ejector plate pull-back pin 110 to the ejector plate 100. The connection portion 106 is a circular columnar-shaped pin which projects from the ejector plate 100, for example. A hole corresponding to the connection portion 106 is formed in an end portion of the ejector plate pull-back pin 110 of the embodiment 4. By allowing the connection portion 106 to pass through the hole, the ejector plate pull-back pin 110 is connected to the ejector plate 100.

The movable-side mold 24 basically has the substantially same constitution as the movable-side mold 20 of the embodiment 1. However, as shown in FIG. 10B and FIG. 11A to FIG. 11C, the movable-side mold 24 of this embodiment 4 further includes a an ejector plate pull-back pin hole 26 for allowing the ejector plate pull-back pin 110 to pass therethrough, and a connecting space 28 for accommodating the connection portion 106 of the ejector plate 100. A size of the ejector plate pull-back pin hole 26 is set slightly larger than a width of the ejector plate pull-back pin 110 to cope with the inclination of the ejector plate pull-back pin 110.

Next, the manner of operation of the ejector plate pull-back pin 110 is explained in conjunction with FIG. 11A to FIG. 11C.

Firstly, at the time of molding, as shown in FIG. 11A, the plates 130, 140 of the extending and retracting mechanism 120 are arranged at a position away from the movable-side mold 24. The ejector plate rotating pin 70 is accommodated in an ejector plate rotating pin hole 22. The ejector plate pull-back pin 110 fixes the ejector plate 100 by pulling. The elastic body 150 is compressed between the end portion of the ejector plate pull-back pin 110 and the elastic body housing portion 144.

Next, at the time of ejecting a molded product, as shown in FIG. 11B, the plates 130, 140 of the extending and retracting mechanism 120 advance in the direction that the plates 130, 140 approach the movable-side mold 24, and the plates 130, 140 are arranged at a position near the movable-side mold 24. The ejector plate rotating pin 70 advances in the direction perpendicular to a rotary shaft 104 thus rotating the ejector plate 100 by pushing.

On the other hand, ejector plate pull-back pin 110 also advances in the direction that the ejector plate pull-back pin 110 approaches the movable-side mold 24 along with the movement of the plates 130, 140. In this case, the end portion of the ejector plate pull-back pin 110 enters the dampening space 132 and, further, the elastic body 150 is extended between the end portion of the ejector plate pull-back pin 110 and the elastic body housing portion 144 (that is, the ejector plate pull-back pin 110 being not directly fixed to the extending and retracting mechanism 120). Accordingly, the ejector plate pull-back pin 110 does not generate an ejecting force similar to an ejecting force which the ejector plate rotating pin 70 generates. Due to such a mechanism, in the molding device 4, at the time of rotating the ejector plate 100 by ejection, a force with which the ejector plate pull-back pin 110 ejects the ejector plate 100 becomes smaller than a force with which the ejector plate rotating pin 70 ejects the ejector plate 100.

At the time of ejecting a molded product, since the ejector plate pull-back pin 110 is connected to the connection portion 106 of the ejector plate 100, the ejector plate pull-back pin 110 is slightly inclined along with the rotation of the ejector plate 100 (see FIG. 11B).

Next, after the molded product is ejected, as shown ion FIG. 11C, the plates 130, 140 of the extending and retracting mechanism 120 retract in the direction away from the movable-side mold 24, and the plates 130, 140 return to the position away from the movable-side mold 24. The ejector plate rotating pin 70 retracts in the direction perpendicular to the rotary shaft 104. The ejector plate pull-back pin 110 returns the ejector plate 100 to the position before molding by rotating the ejector plate 100 by pulling the ejector plate 100 using the retracting movement of the plates 130, 140 and an elastic force of the elastic body 150 which is compressed between the end portion of the ejector plate pull-back pin 110 and the elastic body housing portion 142.

While the ejector plate 60 is pulled back by making use of a force which is generated when the elastic member (spring) shrinks in the embodiment 1, the ejector plate 110 is pulled back by making use of a force which is generated when the elastic member extends in the embodiment 4. Accordingly, it is possible to prevent the occurrence of a case where the elastic member extends excessively so that the ejector plate cannot be smoothly pulled back.

In this manner, the molding device 4 according to the embodiment 4 differs from the molding device 1 according to the embodiment 1 with respect to the structure for pulling back the ejector plate. However, the molding device 4 according to the embodiment 4 uses the ejector plate 110 which ejects a molded product formed around the core 80 along a circular arc shape and hence, in the same manner as the molding device 1 according to the embodiment 1, the molding device 4 can remove a molded product more smoothly than conventional molding devices remove. Accordingly, it is possible to provide the molding device which can suppress the generation of flaws on a molded product when the molded product is removed.

Further, the molding device 4 according to the embodiment 4 includes the ejector plate pull-back pin 110 which returns the ejector plate 100 to the position before molding and hence, the ejector plate 100 can be pulled back after the ejector plate rotating pin 110 ejects the ejector plate 100.

According to the molding device 4 of the embodiment 4, the extending and retracting mechanism 120 as described above is used popularly in the molding device provided with molds and hence, the increase of the number of parts in the molding device can be suppressed. As a result, it is possible to prevent a manufacturing cost of the molding device from being pushed up.

According to the molding device 4 of the embodiment 4, the ejector plate pull-back pin 110 is directly mounted on the extending and retracting mechanism 120 and hence, the ejector plate 100 can be surely ejected by making use of the movement of the extending and retracting mechanism.

According to the molding device 4 of the embodiment 4, the ejector plate pull-back pin 110 is mounted on the extending and retracting mechanism 120 with the elastic body 150 sandwiched therebetween. Accordingly, the difference between an extending amount and a retracting amount caused by the difference in position between the ejector plate rotating pin and the ejector plate pull-back pin is absorbed by the elastic body and hence, the extending and retracting of the ejector plate can be performed in a stable manner.

According to the molding device 4 of the embodiment 4, due to the above-mentioned constitution, even when there is a small error in the movement of the extending and retracting mechanism, the elastic body absorbs such an error and hence, it is possible to surely return the ejector plate to the position before molding.

According to the molding device 4 of the embodiment 4, in rotating the ejector plate 100 by ejecting, in rotating the ejector pin by ejecting, a force with which the ejector plate pull-back pin 110 pushed the ejector plate 100 is smaller than a force with which the ejector plate rotating pin 70 ejects the ejector plate 100 and hence, a force which is applied to a connection portion between the ejector plate 100 and the ejector plate pull-back pin 110 can be suppressed thus preventing the connection portion from being broken.

The molding device 4 according to the embodiment 4 has the substantially same constitution as the molding device 1 according to the embodiment 1 other than the structure for pulling back the ejection plate. Accordingly, out of the advantageous effects which the molding device 1 according to the embodiment 1 acquires, the molding device 4 according to the embodiment 4 acquires the exactly same advantageous effects as the molding device 1 according to the embodiment 1 with respect to the constitutional parts of the molding device 4 according to the embodiment 4 which are equal to the constitutional parts of the molding device 1 according to the embodiment 1.

[Embodiment 5]

Figure 12A:
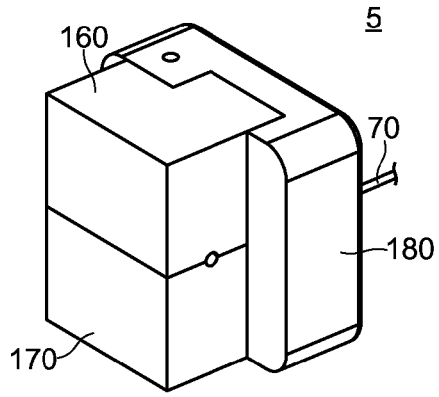
FIG. 12A to FIG. 12E are perspective views for explaining a molding device 5 according to an embodiment 5.
Figure 12D:
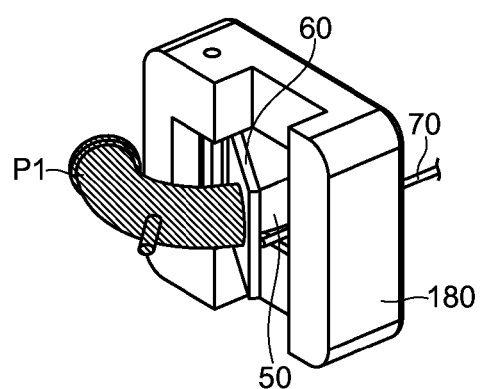
Figure 12B:
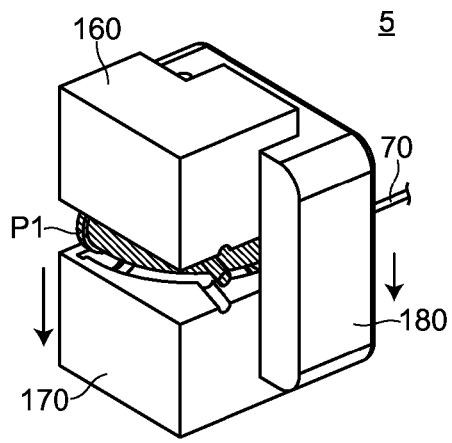
Figure 12E:
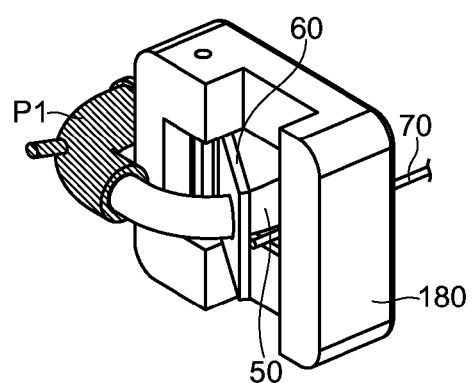
Figure 12C:
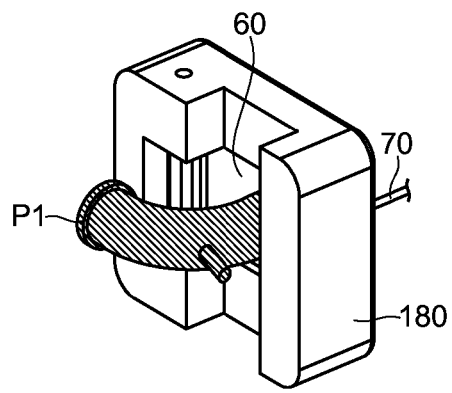

FIG. 12A to FIG. 12E are perspective views for explaining a molding device 5 according to an embodiment 5. FIG. 12A to FIG. 12E are views showing steps in manufacturing a molded product P1 using the molding device 5. FIG. 12A is a view corresponding to FIG. 6A1, FIG. 12B is a view corresponding to FIG. 6B1, FIG. 12C is a view corresponding to FIG. 6C1, FIG. 12D is a view corresponding to FIG. 7A1, and FIG. 12E is a view corresponding to FIG. 7B1 respectively.

The molding device 5 according to the embodiment 5 basically has the substantially same constitution as the molding device 1 according to the embodiment 1. However, the molding device 5 according to the embodiment 5 differs from the molding device 1 according to the embodiment 1 with respect to the direction of the molding device. That is, as shown in FIG. 12A to FIG. 12E, the molding device 5 of the embodiment 5 is a molding device obtained by inclining the molding device 1 according to the embodiment 1 by 90°. In the molding device 5 of the embodiment 5, a set of molds 160, 170 which corresponds to the set of molds 30, 40 in the embodiment 1 is not formed of a slide mold, and corresponds to the fixed-side mold and the movable-side mold respectively. A side mold 180 which corresponds to the movable-side mole 20 in the embodiment 1 mainly has a function of supporting an ejector plate 60. The molding device 5 does not include a member corresponding to the fixed-side mold 10 in the embodiment 1.

A conventionally-used extending and retracting mechanism (including a plate, for example) which moves the slide mold can be used for extending and retracting an ejector plate rotating pin 70.

As shown in FIG. 12B and FIG. 12C, out of the set of molds, the mold 170 (corresponding to the movable-side mold) is separated from the mold 160 (corresponding to the fixed-side mold) together with the side mold 180 and, then, the mold 170 is separated also from the side mold 180. As a result, as shown in FIG. 12C, the side mold 180 is left together with a molded product P1 (that is, the molded product being exposed to the outside). The ejection of the molded product P1 is substantially equal to the ejection of the molded product P1 in the embodiment 1 other than the direction and hence, the explanation of the ejection is omitted.

In this manner, the molding device 5 according to the embodiment 5 differs from the molding device 1 according to the embodiment 1 with respect to the direction of the molding device 5. However, the molding device 5 according to the embodiment 5 uses the ejector plate 110 which ejects a molded product formed around the core 80 along a circular arc shape and hence, in the same manner as the molding device 1 according to the embodiment 1, the molding device 5 can remove a molded product more smoothly than conventional molding devices remove. Accordingly, it is possible to provide the molding device which can suppress the generation of flaws on a molded product when the molded product is removed.

The molding device 5 according to the embodiment 5 has the substantially same constitution as the molding device 1 according to the embodiment 1 other than the direction of the molding device 5. Accordingly, out of the advantageous effects which the molding device 1 according to the embodiment 1 acquires, the molding device 5 according to the embodiment 5 acquires the exactly same advantageous effects as the molding device 1 according to the embodiment 1 with respect to the constitutional parts of the molding device 5 according to the embodiment 5 which are equal to the constitutional parts of the molding device 1 according to the embodiment 1.

Although the present invention has been explained in conjunction with the above-mentioned embodiments heretofore, the present invention is not limited to the above-mentioned embodiments. The present invention can be carried out in various modes without departing from the gist of the present invention. For example, the following modifications are also conceivable.

(1) The number of constitutional elements, materials, shapes, positions, sizes and the like of the molding devices described in the respective embodiments described above are examples, and these components can be changed so long as advantageous effects of the present invention are not impaired. For example, the number of the ejector plate rotating pins may be two or more. In this case, the ejector plate rotating pins may be arranged in a dispersed manner at portions near corners of the ejector plate.

(2) In the above-mentioned respective embodiment, the molding device of the present invention has been explained by taking the molding device which includes the fixed-side mold 10 and the movable-side mold 20 as an example. However, the present invention is not limited to such a molding device. The molding device may not include either one of the fixed-side mold and the movable-side mold or may include neither of them.

(3) In the above-mentioned embodiment 1, the method of manufacturing a molded product according to the present invention has been explained using the molding device 1 according to the embodiment 1. However, the present invention is not limited to such a method. The method of manufacturing a molded product of the present invention can be carried out using various molding devices.

(4) In the above-mentioned respective embodiments, the molding device of the present invention has been explained by taking the core, the ejector plate and the ejector plate rotating pin which are mounted on the movable-side mold 20 as examples. However, the present invention is not limited to such a molding device. For example, a core, an ejector plate, an ejector plate rotating pin which may be mounted on the fixed-side mold. A core, an ejector plate and an ejector plate rotating pin may be mounted on a mold which constitutes the set of molds. Further, a core, an ejector plate and an ejector plate rotating pin which may be mounted on different constitutional elements (a fixed-side mold, a movable-side mold and the like) respectively.

(5) In the above-mentioned respective embodiments, the ejector plate which is configured to be rotatable about the rotary shaft perpendicular to a plane along a circular arc shape is used. However, the present invention is not limited to such a constitution. For example, in conformity with a shape of a core to be used (for example, a core which is bent in a curved shape following an elliptical shape or a core which is bent along a shape where a straight line is added to an end portion of a circular arc shape), an ejector plate which is rotatable in a curved shape following the elliptical shape or an ejector plate which is rotatable after the ejector plate slightly moves linearly may be used.

Figure 13:
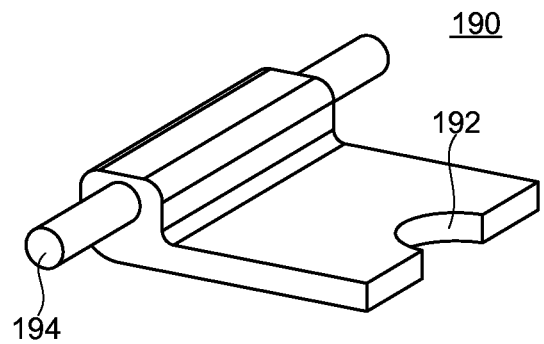
FIG. 13 is a perspective view for explaining an ejector plate 190 in a modification 1.
Figure 14:
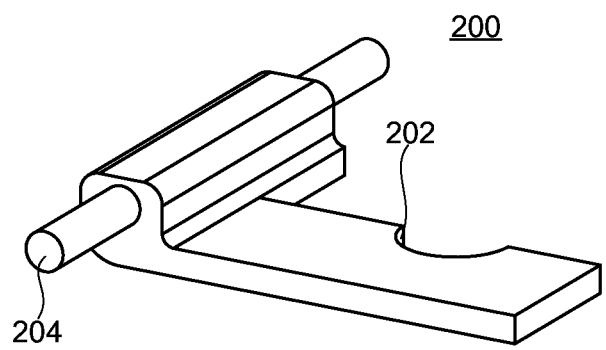
FIG. 14 is a perspective view for explaining an ejector plate 200 in a modification 2.
Figure 15:
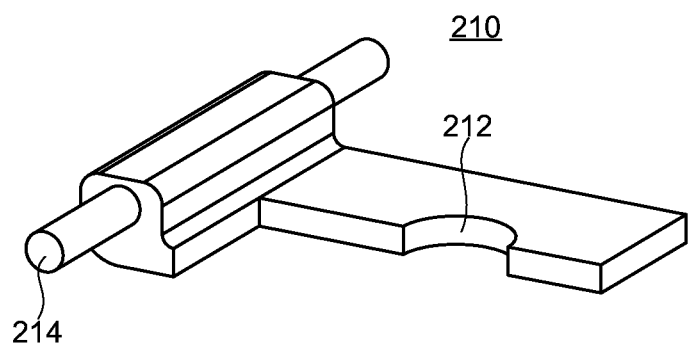
FIG. 15 is a perspective view for explaining an ejector plate 210 in a modification 3.

(6) In the above-mentioned respective embodiment, the ejector plate having the core thorough hole which is formed so as to completely surround the periphery of the core is used. However, the present invention is not limited to such an ejector plate. FIG. 13 is a perspective view for explaining an ejector plate 190 of a modification 1. FIG. 14 is a perspective view for explaining an ejector plate 200 of a modification 2. FIG. 15 is a perspective view for explaining an ejector plate 210 of a modification 3. As shown in FIG. 13 to FIG. 15, for example, an ejector plate having a core through hole (see symbols 192, 202, 212) which is formed so as to surround a portion of the core may be used.

Figure 16A:
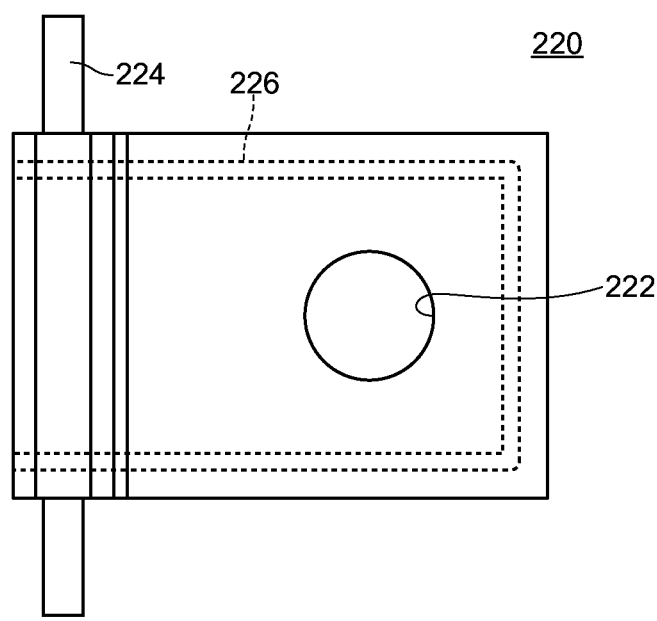
FIG. 16A and FIG. 16B are views for explaining an ejector plate 220 in a modification 4.
Figure 16B:
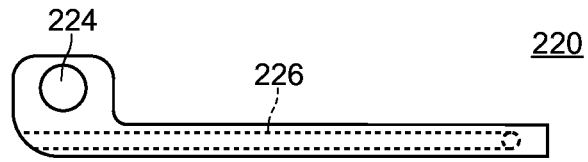
Figure 17A:
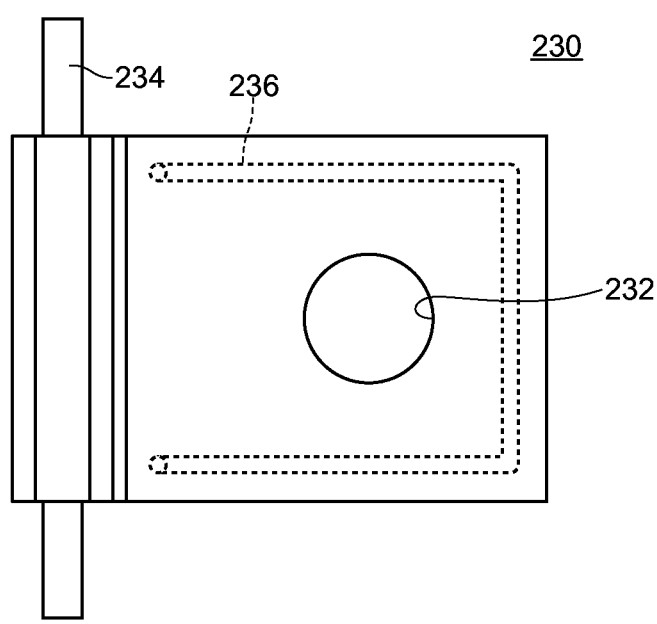
FIG. 17A and FIG. 17B are views for explaining an ejector plate 230 in a modification 5.
Figure 17B:
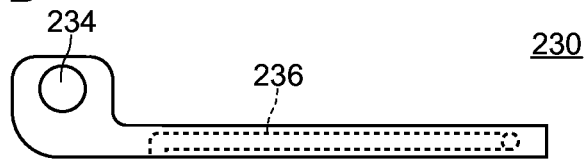
Figure 18A:
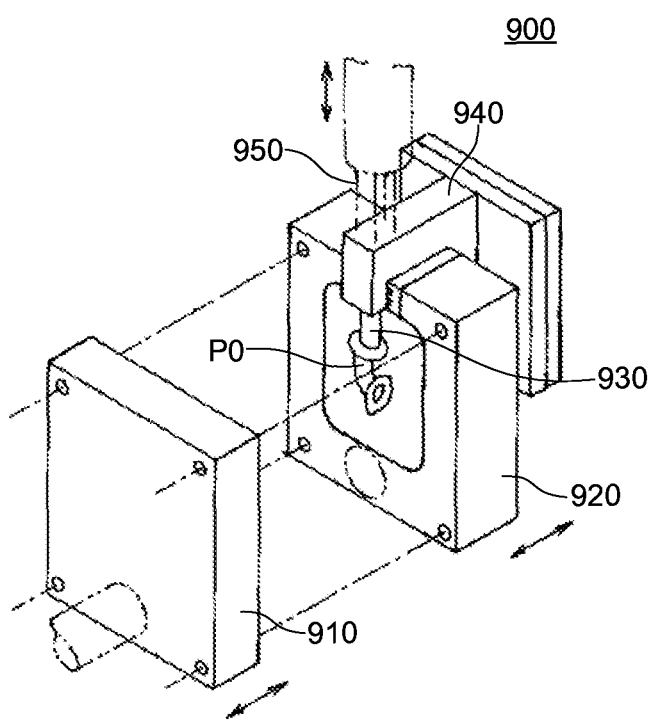
FIG. 18A and FIG. 18B are views for explaining a conventional molding device 900.
Figure 18B:
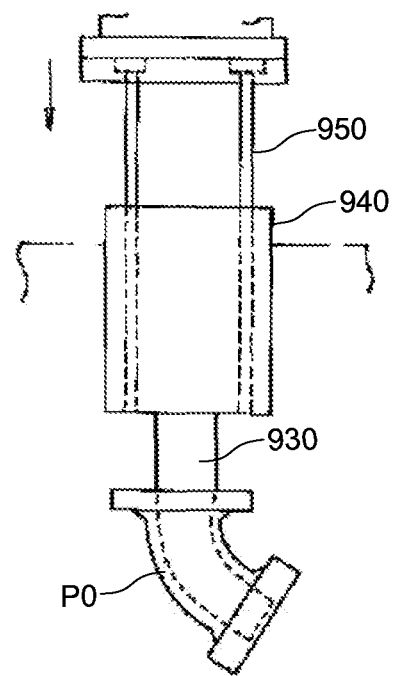

(7) In the above-mentioned embodiment 2, the ejector plate 90 in which the refrigerant flow path 96 is formed is used. However, the present invention is not limited to such an ejector plate. FIG. 16A and FIG. 16B are views for explaining an ejector plate 220 of a modification 4. FIG. 16A is a top plan view of the ejector plate 220 and FIG. 16B is a side view of the ejector plate 220. FIG. 17A and FIG. 17B are views for explaining an ejector plate 230 of a modification 5. FIG. 17A is a top plan view of the ejector plate 230, and FIG. 17B is a side view of the ejector plate 230. In FIG. 16A to FIG. 17B, refrigerant flow paths 226, 227 are indicated by a broken line. For example, the ejector plate 220 where a refrigerant flow path 226 which opens on a rotary shaft 224 side is formed as shown in FIG. 16A and FIG. 16B may be used. Further, the ejector plate 230 where a refrigerant flow path 236 which opens downward is formed as shown in FIG. 17 may be used. These refrigerant flow paths may be configured such that each refrigerant flow path has a distal end thereof communicated with a refrigerant flow path (not shown in the drawing) which is formed in a constitutional element (for example, a movable-side mold not shown in the drawing) arranged adjacent to the ejector plate.

The invention claimed is:

1. A molding device for manufacturing a molded product having an inner space bent in a circular arc shape, the molding device comprising:
   a set of molds which is joinable to and separable from each other, the set of molds being capable of forming a cavity having a shape corresponding to an outer shape of the molded product in a joined state at the time of molding;
   a core which has an outer shape corresponding to an inner shape of the molded product, and is used in a state where the core is arranged in the inside of the cavity which the set of molds forms at the time of molding; and
   an ejector plate which has a core through hole through which the core passes, and ejects the molded product formed around the core along the circular arc shape in a separated state where the set of molds is separated from each other, wherein the ejector plate is rotatable about a rotary shaft perpendicular to a plane along the circular arc shape,
   the molding device further includes an ejector plate rotating pin which is extensible and retractable in the direction perpendicular to the rotary shaft, and rotates the ejector plate by pushing, and
   the molding device further includes an ejector plate pull-back pin which is connected to the ejector plate and is configured to return the ejector plate to a position before molding by rotating the ejector plate by pulling after the ejector plate rotating pin rotates the ejector plate by pushing;
   wherein:
   the ejector plate pull-back pin is connected to the ejector plate by a circular columnar-shaped pin that projects from the ejector plate;
   an end portion of the ejector plate pull-back pin includes a hole corresponding to the circular columnar-shaped pin; and
   the circular columnar-shaped pin is configured to pass through the hole.

2. The molding device of the present invention according to claim 1, wherein the molding device further includes an extending and retracting mechanism which is extensible and retractable in the direction perpendicular to the rotary shaft,
   the ejector plate rotating pin is directly mounted on the extending and retracting mechanism, and
   the ejector plate pull-back pin is mounted on the extending and retracting mechanism with an elastic body sandwiched therebetween.

3. The molding device of the present invention according to claim 1, wherein the molding device further includes a fixed-side mold and a movable-side mold which are capable of being joined to each other or separated from each other along the direction different from the set of molds, the fixed-side mold and the movable-side mold capable of sandwiching the set of molds therebetween when the fixed-side mold and the movable-side mold are joined to each other.

4. The molding device of the present invention according to claim 3, wherein the core is mounted on the movable-side mold at a proximal end portion thereof, and
   a molded product is ejected in a state where a distal end portion of the core is positioned above the proximal end portion of the core.

5. The molding device of the present invention according to claim 1, wherein the ejector plate is configured to face the cavity at the time of molding thus forming an outer shape of the molded product together with the set of molds.

6. The molding device of the present invention according to claim 1, wherein the ejector plate is separated from the cavity at the time of molding.

7. The molding device of the present invention according to claim 1, wherein a refrigerant flow path is formed in the inside of the ejector plate.

8. The molding device of the present invention according to claim 1, wherein a refrigerant flow path is formed in the inside of the core.

9. A method for manufacturing a molded product having an inner space bent in a circular arc shape, the method comprising in the following order:
- a forming step where the molded product is formed between a set of molds which is capable of forming a cavity having a shape corresponding to an outer shape of the molded product in a state where the molds are joined to each other and a core having a shape corresponding to an inner shape of the molded product;
- a mold separating step where the set of molds are separated from the molded product so as to exposed the molded product; and
- an ejecting step where the molded product formed around the core is ejected along the circular arc shape using an ejector plate having a core through hole through which the core passes, wherein:
- an ejector plate pull-back pin is connected to the ejector plate by a circular columnar-shaped pin that projects from the ejector plate;
- an end portion of the ejector plate pull-back pin includes a hole corresponding to the circular columnar-shaped pin;
- the circular columnar-shaped pin is configured to pass through the hole;
- the ejector plate is configured to be rotatable around a rotary shaft perpendicular to a plane along the circular arc shape;
- the method further includes at some point rotating the ejector plate by an ejector plate rotating pin via a pushing action, the rotating pin being configured to be extensible and retractable in a direction perpendicular to the rotary shaft; and
- the method further includes returning the ejector plate to a position before the forming step by rotating the ejector plate by a pulling action after the ejector plate rotating pin rotates the ejector plate by pushing.

* * * * *